United States Patent
Lee et al.

(10) Patent No.: US 9,543,655 B2
(45) Date of Patent: Jan. 10, 2017

(54) FOLDED NEAR FIELD COMMUNICATION ANTENNA

(71) Applicant: AQ CORPORATION, Suwon-Si, Gyeonggi-Do (KR)

(72) Inventors: Sang Hoon Lee, Suwon (KR); Kyung Jun Choi, Seoul (KR)

(73) Assignee: AQ CORPORATION, Suwon-Si (KR)

( * ) Notice: Subject to any disclaimer, the term of this patent is extended or adjusted under 35 U.S.C. 154(b) by 81 days.

(21) Appl. No.: 14/366,634

(22) PCT Filed: Dec. 18, 2012

(86) PCT No.: PCT/KR2012/011067
§ 371 (c)(1),
(2) Date: Sep. 22, 2014

(87) PCT Pub. No.: WO2013/094962
PCT Pub. Date: Jun. 27, 2013

(65) Prior Publication Data
US 2015/0035717 A1    Feb. 5, 2015

(30) Foreign Application Priority Data

Dec. 19, 2011  (KR) .................. 10-2011-0137199

(51) Int. Cl.
*H01Q 1/00*    (2006.01)
*H01Q 7/06*    (2006.01)
(Continued)

(52) U.S. Cl.
CPC .................. *H01Q 7/06* (2013.01); *H01Q 1/38* (2013.01); *H04B 5/0025* (2013.01)

(58) Field of Classification Search
CPC ........... H01Q 1/38; H01Q 7/06; H01Q 5/0025
(Continued)

(56) References Cited

U.S. PATENT DOCUMENTS 7,000,837 B2 * 2/2006 Akiho .................. G06K 7/0008
                                                        235/451
7,712,672 B2 * 5/2010 Takahashi .......... G06K 7/10336
                                                        235/492
(Continued)

FOREIGN PATENT DOCUMENTS

| KR | 10-2003-0076039 A | 9/2003 |
| KR | 10-2006-0008332 A | 1/2006 |
| KR | 10-2007-0006702 A | 1/2007 |

OTHER PUBLICATIONS

International Search Report dated Feb. 21, 2013 of PCT/KR2012/011067 which is the parent application and its English translation—4 pages.

*Primary Examiner* — Hoanganh Le
(74) *Attorney, Agent, or Firm* — Knobbe Martens Olson & Bear LLP (57) ABSTRACT

Provided is an antenna structure which is capable of having sufficient antenna performance even in an antenna having a small cross-sectional area. The antenna of the present invention comprises: a ferrite sheet; and an antenna sheet (flexible printed circuit board) which has a spiral loop antenna pattern. The antenna sheet is folded and the ferrite sheet is inserted therein to form a folded antenna. The folded antenna is configured in such a manner that a longitudinal pattern of the spiral loop antenna pattern is disposed close to a longitudinal centerline portion of the ferrite sheet.

7 Claims, 9 Drawing Sheets

(51) Int. Cl.
*H01Q 1/38* (2006.01)
*H04B 5/00* (2006.01)

(58) Field of Classification Search
USPC .................................. 343/702, 895, 787, 788
See application file for complete search history.

(56) References Cited

U.S. PATENT DOCUMENTS

| 2007/0069961 | A1* | 3/2007 | Akiho | H01Q 21/0025 343/702 |
| 2010/0309081 | A1* | 12/2010 | Kobayashi | G06K 7/10316 343/788 |
| 2012/0081258 | A1* | 4/2012 | Yosui | H01Q 7/08 343/788 |

* cited by examiner

FOLDED NEAR FIELD COMMUNICATION ANTENNA

TECHNICAL FIELD

The present invention relates to the structure of a Near Field Communication (NFC) antenna, and more particularly, to an NFC antenna attached to a mobile terminal so as to reduce the size of the terminal.

BACKGROUND ART

For a spiral loop antenna generally attached to a battery and housed in a terminal, the antenna has an antenna pattern formed in a single plane and is attached to one side of the battery.

When the size of the antenna is larger than a certain size (e.g., a size of at least 50 mm×40 mm), the use of the antenna that has a loop antenna pattern formed on a single side thereof and then is attached to a battery does not cause a problem with the performance of the antenna. However, if the size of the antenna is decreased, the performance of the antenna may be deteriorated.

This is because the smaller size of the antenna causes a problem in that a spiral loop antenna pattern formed in a single plane would not be able to exhibit sufficient antenna performance.

Accordingly, such a case requires an antenna structure that prevents deterioration of the performance of an antenna.

SUMMARY

An aspect of the present invention is conceived to solve the aforementioned problems. Accordingly, an aspect of the present invention is to provide an antenna structure allowing even a smaller antenna to exhibit sufficient antenna performance.

Other aspects of the present invention could be readily understood through embodiments described below.

One aspect of the present invention provides a folded type near field communication (NFC) antenna, including: a ferrite sheet; and an antenna sheet having a spiral loop antenna pattern, wherein the antenna sheet is folded and the ferrite sheet is then inserted between folded portions of the antenna sheet to form a folded antenna, and wherein the folded antenna is configured such that a longitudinal pattern portion of the spiral loop antenna pattern is disposed on a longitudinal centerline of the ferrite sheet.

At least 20% of the width of the longitudinal pattern portion of the spiral loop antenna pattern may be disposed above or below the longitudinal centerline on any one side of the ferrite sheet.

50% of the width of the longitudinal pattern portion of the spiral loop antenna pattern may be disposed respectively above and below the longitudinal centerline on any one side of the ferrite sheet.

The number of turns of the spiral loop antenna pattern may be increased to improve the performance of the antenna.

All pattern portions of the spiral loop antenna pattern in all areas may have the same size.

A rear side of the folded antenna may be attached to a battery, and electric terminals of the spiral loop antenna pattern are positioned on a front side of the folded antenna.

The antenna pattern may be formed on the antenna sheet by at least one method of a Flexible Printed Circuit Board (FPCB) method, a coil embedding method, a coil winding method, an electroforming method, a sputtering method, a conductive ink printing method and a stamping method.

Since the spiral loop pattern antenna formed on a single side can be used even in a state folded in half, the antenna can be disposed in a smaller area, thereby allowing for a smaller mobile terminal.

EMBODIMENTS

Although various changes and numerous embodiments may be made in the present invention, certain embodiments will be illustrated in the accompanying drawings and set forth in detail in the following description. However, this is not intended to limit the present invention to the certain embodiments, and it should be appreciated that all changes, equivalents, and substitutes falling within the spirit and scope of the present invention are encompassed in the present invention.

The terms used herein are merely for the purpose of describing the particular embodiments and are not intended to limit the present invention. Unless the context clearly indicates otherwise, singular forms of the terms are intended to include plural forms as well.

Hereinafter, embodiments of the present invention are described in detail with reference to the accompanying drawings below.

Embodiments of the present invention relate to a folded type NFC antenna. For the convenience of explanation, it is assumed hereinafter that a folded antenna refers to the folded type NFC antenna.

Figure 1:
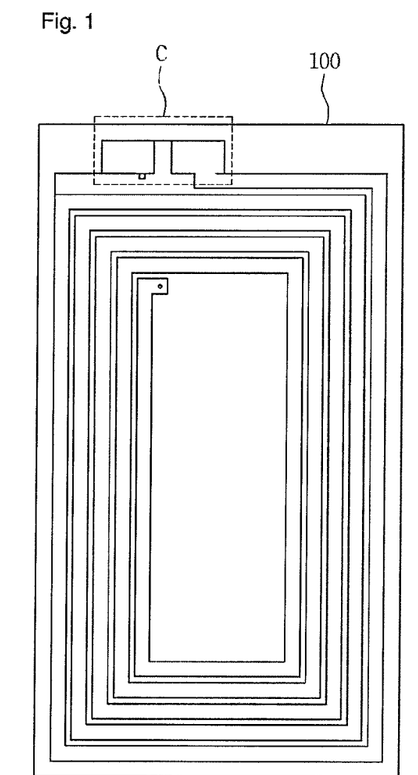
FIG. 1 is a view showing an antenna sheet having a spiral loop antenna pattern according to an embodiment of the present invention.

FIG. 1 is a view showing an antenna sheet having a spiral loop antenna pattern according to an embodiment of the present invention.

The spiral loop antenna pattern according to embodiments of the present invention may be formed by winding a wire in various shapes, such as a square, rectangle, triangle, circle, etc. The loop pattern may be formed using a single wire or more than one wires.

Hereinafter, for the convenience of explanation, embodiments of the present invention will be described by way of example in connection with an antenna pattern having a rectangular loop shape using one wire.

As shown in FIG. 1, a spiral loop antenna pattern is formed on an antenna sheet 100. Further, an electric terminal unit C of the spiral loop antenna pattern is formed at one end of the antenna sheet 100.

The antenna sheet 100 may be formed with the antenna pattern by at least one of various methods including a Flexible Printed Circuit Board (FPCB) method, a coil embedding method, a coil winding method, an electroforming method, a sputtering method, a conductive ink printing method, a stamping method, etc.

Figure 2:
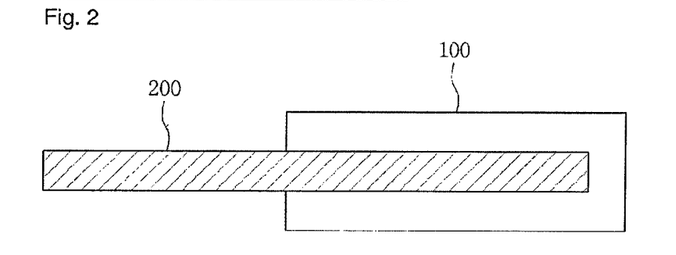
FIG. 2 shows a top view of a folded antenna according to an embodiment of the present invention.

FIG. 2 shows a top view of a folded antenna according to an embodiment of the present invention.

The folded antenna according to embodiments of the present invention is formed by folding an antenna sheet 100 having a spiral loop antenna pattern in half and then inserting a ferrite sheet 200 between the halves of the folded antenna sheet. FIG. 2 shows the top view of the folded antenna formed by the aforementioned method, illustrating that the antenna sheet 100 is folded in half and the ferrite sheet 200 is inserted between the halves of the antenna sheet.

Figure 3:
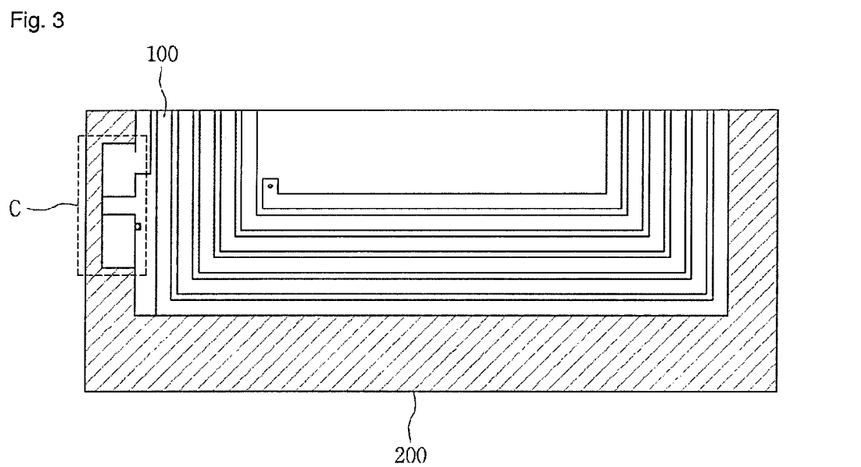
FIG. 3 is a view showing a front side of a folded antenna according to an embodiment of the present invention.

FIG. 3 is a view showing a front side of a folded antenna according to an embodiment of the present invention.

The front side refers to the side of the folded antenna that is exposed to the outside when the folded antenna is attached to a battery 300. FIG. 3 is a view showing the front side of the folded antenna, and an electric terminal unit C of the spiral loop antenna pattern is formed on the front side of the folded antenna.

In embodiments, in order to prevent deterioration of the performance of the folded antenna, the antenna sheet 100 is disposed at a central part of the ferrite sheet 200 such that the spiral loop antenna pattern is not disposed at the perimeter of the ferrite sheet 200.

Figure 4:
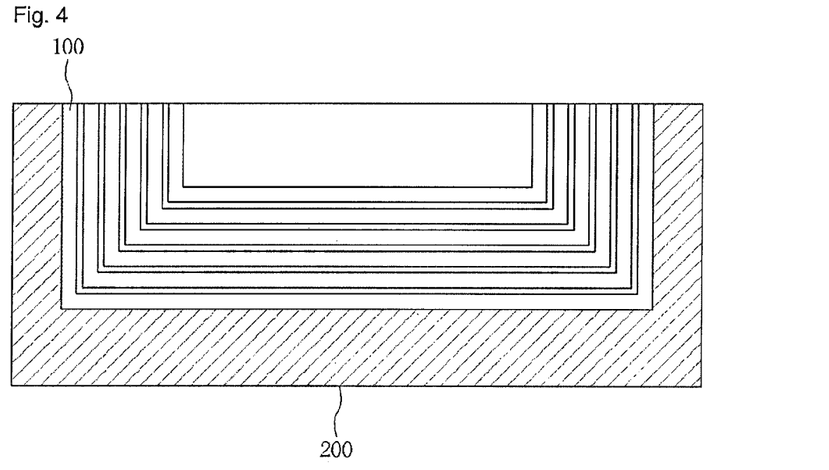
FIG. 4 is a view showing a rear side of a folded antenna according to an embodiment of the present invention.

FIG. 4 is a view showing a rear side of a folded antenna according to an embodiment of the present invention.

The rear side refers to a side of the folded antenna that is attached to the battery 300. FIG. 4 is a view showing the rear side of the folded antenna, wherein the antenna sheet 100 is adapted to be disposed at the central part of the ferrite sheet 200, as shown in FIG. 3.

Figure 5:
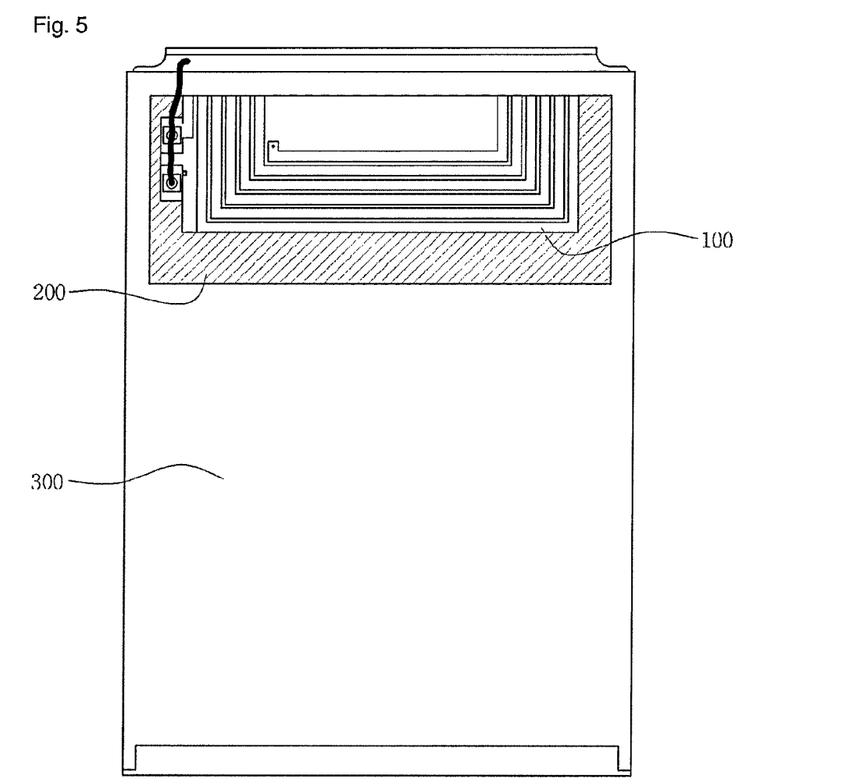
FIG. 5 is a view showing an example having a folded antenna attached to a battery according to an embodiment of the present invention.

FIG. 5 is a view showing an example having a folded antenna attached to a battery according to an embodiment of the present invention;

As described above, the rear side of the folded antenna is adhered to the battery 300, and the front side is exposed to the outside of the battery 300. Accordingly, since the front side of the folded antenna can be placed just below a battery cover, the antenna may receive external signals much better.

The rear side of the folded antenna may be attached to a metallic surface of a mobile terminal.

Moreover, as shown in FIG. 5, the electric terminal unit C of the spiral loop antenna pattern can be positioned at a peripheral portion of the front side of the folded antenna.

Figure 6:
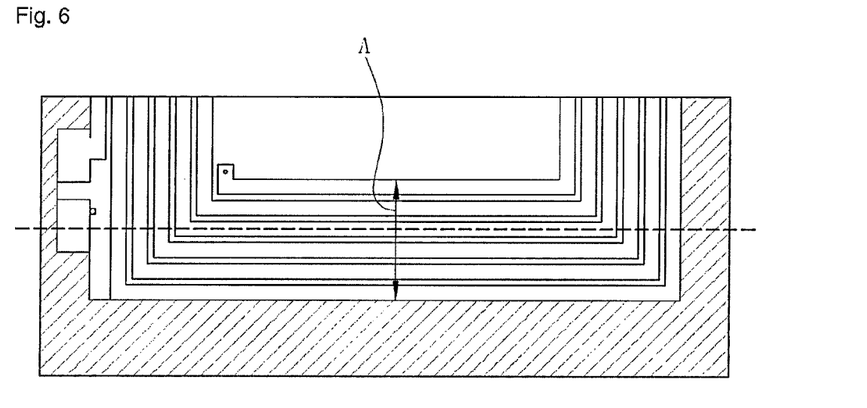
FIG. 6 shows a front view of a folded antenna in which a longitudinal pattern portion of a spiral loop antenna pattern is disposed on a longitudinal centerline of a ferrite sheet according to an embodiment of the present invention.

FIG. 6 shows a front view of a folded antenna in which a longitudinal pattern portion of a spiral loop antenna pattern is disposed on a longitudinal centerline of a ferrite sheet according to an embodiment of the present invention;

The folded antenna according to embodiments of the present invention is configured such that at least 20% of the width A of the pattern portion of the spiral loop antenna pattern formed along the longitudinal axis is disposed above or below the longitudinal centerline of the ferrite sheet.

For example, if the width A of the pattern portion of the spiral loop antenna pattern formed along the longitudinal axis is assumed to be 1 cm, and the width disposed above the longitudinal centerline of the ferrite sheet is 0.3 cm (i.e., 30% of the width A), the width of the pattern portion formed along the longitudinal axis disposed below the longitudinal centerline of the ferrite sheet is 0.7 cm (i.e., 70% of the width A).

Figure 9:
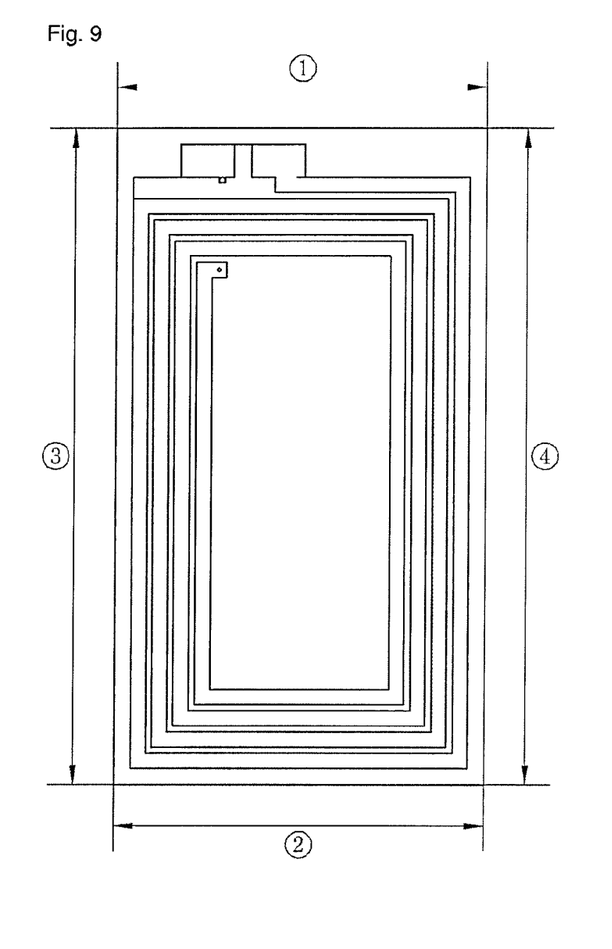
FIGS. 9 to 12 are views showing improvement of the performance of a folded antenna by means of changes in a spiral loop antenna pattern of the antenna according to the present invention.

The longitudinal axis of the spiral loop antenna pattern is an axis along which a pattern portion of the loop antenna pattern has the longest length on one side and represents each of axes denoted by ③ and ④ in FIG. 9. In addition, a lateral axis of the spiral loop antenna pattern is an axis along which a pattern portion of the loop antenna pattern has the shortest length on one side and represents each of axes denoted by ① and ② in FIG. 9.

The folded antenna according to embodiments of the present invention is configured such that at least 50% of the width A of the pattern portion of the spiral loop antenna pattern formed along the longitudinal axis is disposed above and below the longitudinal centerline of the ferrite sheet, respectively.

That is, 50% of the width A of the pattern portion of the spiral loop antenna pattern formed along the longitudinal axis is disposed above the longitudinal centerline of the ferrite sheet, and 50% of the width A of the pattern portion formed along the longitudinal axis is also disposed below the longitudinal centerline of the ferrite sheet.

When the pattern portion of the spiral loop antenna pattern formed along the longitudinal axis is disposed on the longitudinal centerline of the ferrite sheet in such a manner, the performance of the antenna may be improved.

Figure 7:
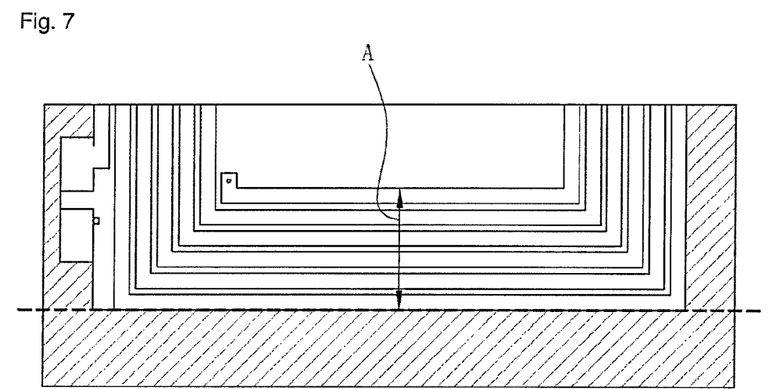
FIG. 7 shows a front view of a folded antenna in which a longitudinal pattern portion of a spiral loop antenna pattern is placed entirely above a longitudinal centerline of a ferrite sheet.
Figure 8:
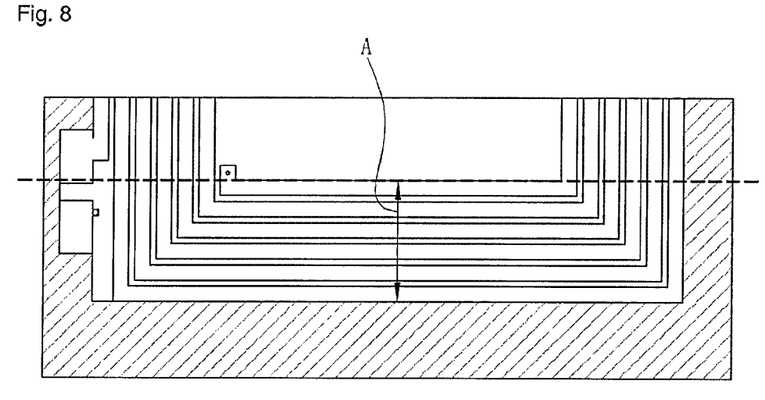
FIG. 8 shows a front view of a folded antenna in which the width of a pattern portion of a spiral loop antenna pattern formed along a longitudinal axis is placed entirely below a longitudinal centerline of a ferrite sheet.

FIG. 7 shows a front view of a folded antenna in which a longitudinal pattern portion of a spiral loop antenna pattern is placed entirely above a longitudinal centerline of a ferrite sheet, and FIG. 8 shows a front view of a folded antenna in which a pattern portion of a spiral loop antenna pattern formed along a longitudinal axis is placed entirely below a longitudinal centerline of a ferrite sheet.

Table 1 shows results of investigation of the performance of the folded antenna according to embodiments of the present invention as shown in FIG. 6 in which the longitudinal pattern portion of the spiral loop antenna pattern is disposed on the longitudinal centerline of the ferrite sheet, and the performance of the folded antennas as shown in FIGS. 7 and 8 in which the longitudinal pattern portions of the spiral loop antenna patterns are disposed above or below the longitudinal centerline of the ferrite sheet.

TABLE 1

Test results of the performance of NFC antennas having front sides with patterns arranged thereon

| Antenna type | Freq. | T-money | Dongle | Standard 1K | Standard 4K | Ultra-light | Type 4 | Remarks |
|---|---|---|---|---|---|---|---|---|
| NFC test spec. | | At least 45 | At least 30 | At least 25 | | | At least 13 | V1.0 |
| Reference | | 56 | 36 | 42 | 42 | 38 | 23 | Inbound M250 |
| Type of FIG. 6 | 15.6 | 47 | 30 | 34 | 34 | 30 | 18 | Spec-in |
| Type of FIG. 7 | 15.6 | 43 | 26 | 31 | 31 | 27 | 15 | Spec-out |
| Type of FIG. 8 | 15.6 | 43 | 27 | 29 | 30 | 26 | 14 | Spec-out |

The results in Table 1 show that the performance of the folded antenna according to embodiments of the present invention as shown in FIG. 6 in which the longitudinal pattern portion of the spiral loop antenna pattern is disposed on the longitudinal centerline of the ferrite sheet is better than that of the folded antennas shown in FIGS. 7 and 8.

FIGS. 9 to 12 are views of examples of folded antennas that show improvement of the performance by changes in a spiral loop antenna pattern of the antenna according to embodiments of the present invention.

FIG. 9 is a view illustrating an example of pattern areas of a spiral loop antenna pattern according to an embodiment of the present invention.

Among the spiral loop antenna pattern areas shown in FIG. 9, the axes denoted by ① and ② represent the lateral axis, and the axes denoted by ③ and ④ represent the longitudinal axis.

For example, area ③ is an area placed on the front side of the folded antenna, and area ④ is an area placed on the rear side of the folded antenna.

The shapes of antennas depending on the types of design are as follows.

Figure 10:
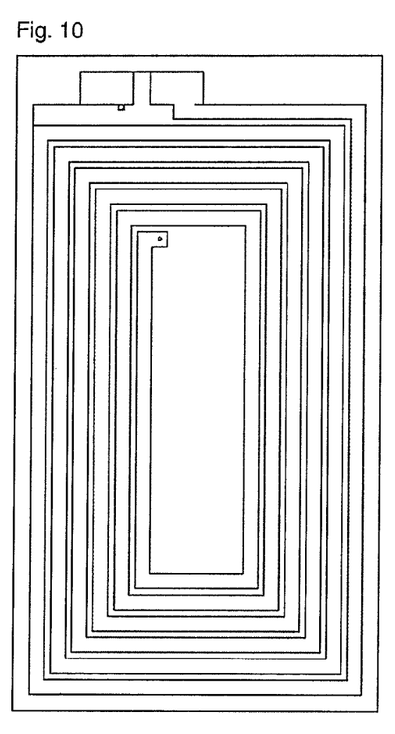
Figure 11:
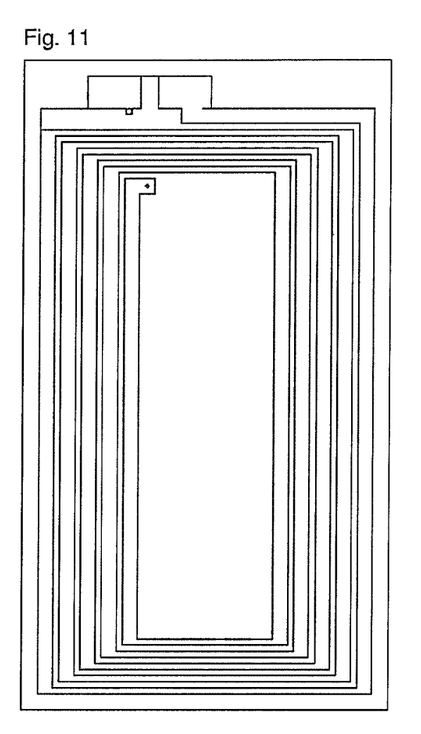
Figure 12:
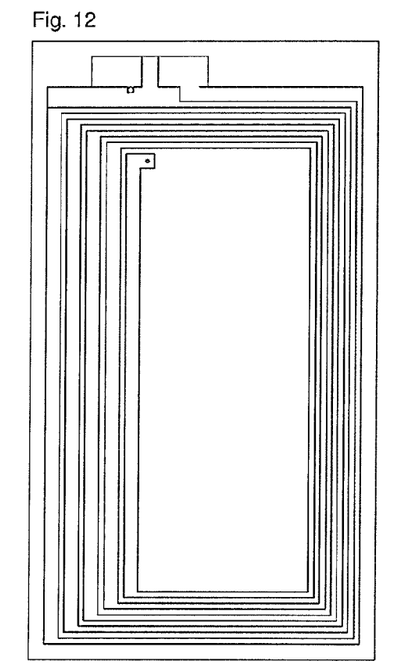

FIG. 9 shows a spiral loop antenna pattern having four turns. FIG. 10 shows a spiral loop antenna pattern having six turns. FIG. 11 shows a spiral loop antenna pattern having six turns, wherein each pattern portion of the spiral loop antenna pattern formed along the lateral axis has a narrow width. FIG. 12 shows a spiral loop antenna pattern having six turns, wherein each pattern portion of the spiral loop antenna pattern formed along the lateral axis and a pattern portion of the spiral loop antenna pattern formed along the longitudinal axis (the longitudinal axis corresponding to area ④), which are disposed on the rear side of the folded antenna, have a narrow width.

Tables 2 and 3 show the performance of antennas according to the types of design described above.

In the test results shown in the tables, higher numerical values mean better antenna performance.

TABLE 2

NFC test results of antenna configurations depending on the types of design

| Antenna type | Freq. | T-money | Dongle | Standard 1K | Standard 4K | Ultra-light | Type 4 | Remarks |
|---|---|---|---|---|---|---|---|---|
| NFC test spec. | | At least 45 | At least 30 | At least 25 | | | At least 13 | V1.0 |
| Reference | | 56 | 36 | 42 | 42 | 38 | 23 | Inbound M250 |
| Type of FIG. 9 | 15.6 | 42 | 23 | — | — | 25 | — | Spec-out |
| Type of FIG. 10 | 15.6 | 47 | 30 | 34 | 34 | 30 | 18 | Spec-in |
| Type of FIG. 11 | — | 48 | 30 | 35 | 35 | 31 | 19 | Spec-in |
| Type of FIG. 12 | 15.6 | 47 | 30 | 34 | 34 | 30 | 19 | Spec-in |

TABLE 3

EMV certification test results of antenna configuration depending on the types of design

| Minimum Test | Type of FIG. 9 | Type of FIG. 10 | Type of FIG. 11 | Type of FIG. 12 |
|---|---|---|---|---|
| Load Modulation | — | Pass | Pass | Fail |
| Responsiveness at Low Power Level | Pass | Pass | Pass | Pass |

* EMV: This refers to a specification of smart cards, terminals and software jointly announced by card companies of Europay, Mastercard and Visa in 1996 to ensure stability and compatibility of cards.

The results of Tables 2 and 3 show that the antenna shown in FIG. 10 exhibits better performance than other designs.

Thus, it can be understood that the better antenna performance is obtained by increasing the number of turns of the spiral loop antenna pattern and designing an antenna to have the same antenna pattern size in all areas.

Figure 13:
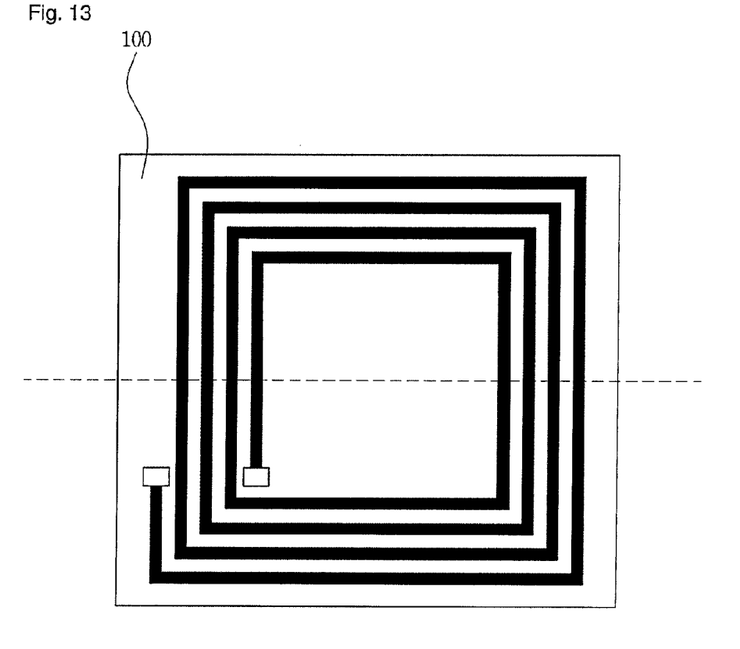
FIG. 13 is a view of the formation of an antenna pattern on one single side of an antenna sheet according to an embodiment of the present invention.

FIG. 13 is a view of the formation of an antenna pattern on one single side of an antenna sheet according to an embodiment of the present invention.

The antenna pattern according to an embodiment of the present invention may be formed in a plurality of layers of an antenna sheet or on only one single side of the antenna sheet.

The example of antenna patterns shown in FIGS. 1 to 12 and described above can be formed in at least one layer of the antenna sheet, and antenna terminals are formed to be adjacent to each other. FIG. 13 shows that an antenna pattern is formed on one single side of an antenna sheet, wherein antenna terminals are positioned to be spaced apart from each other.

In FIG. 13, a dashed line shown in the figure indicates a folding line.

Figure 14A:
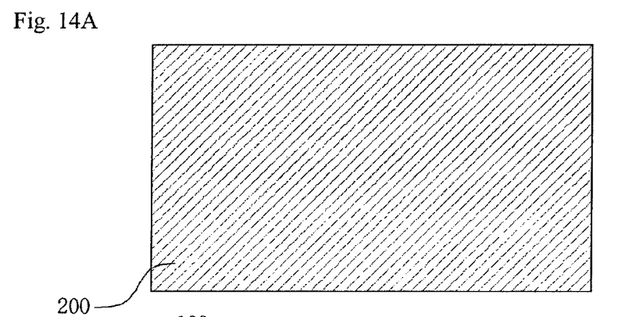
FIGS. 14A-14C are a series of views showing a ferrite sheet, a folded antenna of the present invention, and a typical antenna formed on the same sized area.
Figure 14B:
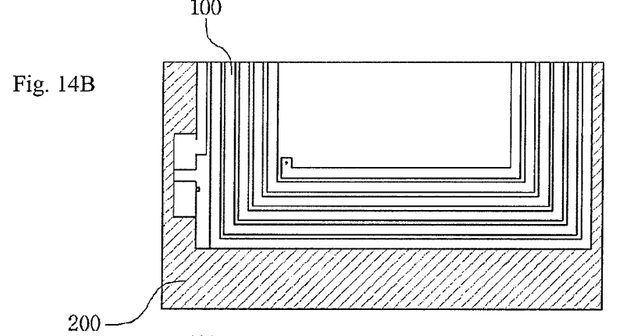
Figure 14C:
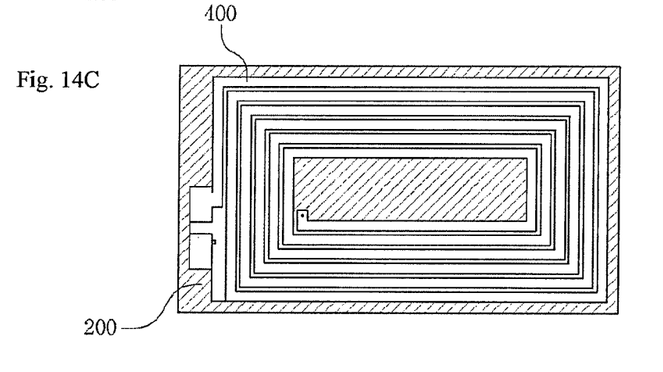

FIG. 14 is a series of views showing a ferrite sheet, a folded antenna according to an embodiment of the present invention and a typical antenna formed on the same sized area.

The reasons why a folded antenna is used in an embodiment of the present invention are as follows.

When the size of an antenna is larger than a certain size (e.g., a size of at least 50 mm×40 mm), the use of a typical antenna that has a loop antenna pattern formed on a single side thereof does not cause a problem with the performance of the antenna. When the size of an antenna is decreased, however, the typical antenna that has a loop antenna pattern formed on a single side thereof may undergo deterioration of its performance.

This is because the smaller size of the antenna causes a problem in that a spiral loop antenna pattern alone formed on a single side of the antenna cannot sufficiently exhibit the performance of the antenna.

Accordingly, in this case, there is a need for a method of improving the performance of the antenna.

FIG. 14A is a view showing a ferrite sheet having a small size, for example, a size of 40 mm×15 mm. FIGS. 14B and 14C are views showing a folded antenna and a typical antenna each of which is formed of a ferrite sheet having the same size.

FIG. 14B is a view showing a folded antenna according to an embodiment of the present invention.

FIG. 14C is a view showing a typical antenna.

Next, Tables 4 and 5 are tables for comparisons of performance data, wherein the performance of the folded antenna according to an embodiment of the present invention is compared with that of the typical antenna.

TABLE 4

Korean NFC RF test specifications for folded and typical antennas

| Antenna type | Freq. | T-money | Dongle | Standard 1K | Standard 4K | Ultra-light | Type 4 | Remarks |
|---|---|---|---|---|---|---|---|---|
| NFC test spec. | | At least 45 | At least 30 | At least 25 | | | At least 13 | V1.0 |
| typical antenna | 15.6 | 29 | 21 | 28 | 27 | 24 | 13 | Spec-out |
| Folded antenna | 15.6 | 47 | 30 | 34 | 34 | 30 | 18 | Spec-in |

TABLE 5

EMV certification test results of folded and typical antennas

| Minimum Test | typical antenna | Folded antenna |
|---|---|---|
| Load Modulation | Fail (300: 2.3 mV) | Pass (300: 5.4 mV) |
| Responsiveness at Low Power Level | Pass | Pass |

It can be understood from Tables 4 and 5 that the performance of the folded antenna according to an embodiment of the present invention is better than that of the typical antenna.

Particularly, it can be understood from Table 5 that the folded antenna according to an embodiment of the present invention achieves improvement of the performance by about 200% over the typical antenna.

Although the present invention has been described in connection with the embodiments thereof, it will be readily understood by those skilled in the art that various modifications and changes can be made thereto without departing from the spirit and scope of the present invention defined by the appended claims.

INDUSTRIAL APPLICABILITY

Embodiments of the present invention provide a folded type antenna configuration, thereby providing an antenna structure enabling even a smaller antenna to sufficiently exhibit the performance of the antenna.

The invention claimed is:
1. A mobile communication terminal comprising:
a battery comprising a generally rectangular surface having a first edge and a second edge opposing the first edge; and
a loop antenna comprising a ferrite plate and a spiral loop of a conductive line, the ferrite plate comprising a top surface, a bottom surface, a first side surface and a second side surface facing away from the first side surface the first and second side surfaces connecting the top and bottom surfaces,
the spiral loop comprising a first portion, a second portion, and a middle portion interconnecting and interposed between the first and second portions such that the first, second and middle portions in combination provide an operable antenna loop;
the spiral loop formed on the ferrite plate such that the first portion is on the top surface, the second portion is on the bottom surface, the middle portion is on the first side surface and not on the second side surface,
wherein the loop antenna is overlappingly arranged over the generally rectangular surface of the battery when viewed in a direction perpendicular to the generally rectangular surface, in which the middle portion formed on the first side surface is aligned along and adjacent to the first edge,
wherein a first distance from the first side surface to the first edge is shorter than a second distance from the second side surface to the second edge, wherein the second distance is longer than a third distance from the second side surface to the first edge.
2. The mobile communication terminal of claim 1, wherein the spiral loop comprises substantially linear extensions of the conductive line that are generally parallel to the first edge.
3. The mobile communication terminal of claim 2, wherein the substantially linear extensions of the conductive line comprise a first extension over the top surface and a second extension over the bottom surface, the second extension having a width smaller than that of the first extension.

4. The mobile communication terminal of claim 1, wherein the spiral loop comprises substantially liner extensions of the conductive line that are generally perpendicular to the first edge.

5. The mobile communication terminal of claim 1, wherein the spiral loop defines an inner opening in which the conductive line does not pass, wherein a first portion of the inner opening is over the top surface, a second portion of the inner opening is over the bottom surface, and a middle portion of the inner opening is over the first side surface.

6. The mobile communication terminal of claim 1, wherein the spiral loop defines an inner opening in which the conductive line does not pass, wherein a substantial portion of the inner opening is over the first side surface.

7. The mobile communication terminal of claim 1, wherein the loop antenna comprises a near field communication antenna.

* * * * *